US008081053B2

(12) United States Patent

Yamagata et al.

(10) Patent No.: US 8,081,053 B2
(45) Date of Patent: Dec. 20, 2011

(54) SOLENOID ACTUATOR

(75) Inventors: Hideki Yamagata, Sagamihara (JP); Mamoru Hosogai, Sagamihara (JP); Hideki Tsuchiya, Sagamihara (JP); Yoshiharu Miya, Sagamihara (JP); Tomoyuki Fujita, Kani (JP); Ryuji Naide, Kani (JP); Koichiro Akatsuka, Gifu (JP); Kenji Yazaki, Kani (JP); Masato Ikeguchi, Yokohama (JP)

(73) Assignee: Kayaba Industry Co., Ltd., Tokyo (JP)

( * ) Notice: Subject to any disclaimer, the term of this patent is extended or adjusted under 35 U.S.C. 154(b) by 106 days.

(21) Appl. No.: 12/591,191

(22) Filed: Nov. 12, 2009

(65) Prior Publication Data

US 2010/0123535 A1 May 20, 2010

(30) Foreign Application Priority Data

Nov. 14, 2008 (JP) ................................ 2008-292296

(51) Int. Cl.
*H01F 3/00* (2006.01)
*F16K 31/02* (2006.01)

(52) U.S. Cl. ................................ 335/260; 251/129.15

(58) Field of Classification Search .................. 335/260; 251/129.15

See application file for complete search history.

(56) References Cited

U.S. PATENT DOCUMENTS 3,331,042 A * 7/1967 Erickson et al. .............. 335/260
4,694,270 A * 9/1987 Ichihashi ...................... 335/260
4,698,610 A 10/1987 Pick
5,114,116 A * 5/1992 Muller et al. ............ 251/129.15
5,238,222 A * 8/1993 Sumida et al. ................ 251/118
5,593,133 A * 1/1997 Hunnicutt ................ 251/129.15
5,707,039 A * 1/1998 Hamilton et al. ......... 251/129.17
5,856,771 A 1/1999 Nippert
5,871,201 A * 2/1999 Cornea et al. ............ 251/129.15
6,142,445 A * 11/2000 Kawaguchi et al. ...... 251/129.15
6,182,646 B1 * 2/2001 Silberstein et al. ...... 123/568.26
6,564,443 B2 * 5/2003 Oishi et al. ....................... 29/596
6,628,186 B1 * 9/2003 Wolfges ........................ 335/220
6,679,475 B2 * 1/2004 Rembold et al. ......... 251/129.14
6,732,999 B2 * 5/2004 Matsusaka et al. ...... 251/129.15
6,737,766 B1 * 5/2004 Burrola et al. .................. 310/23
6,892,971 B2 * 5/2005 Rieger et al. ............... 239/585.1

(Continued)

FOREIGN PATENT DOCUMENTS

CN 1281542 A 1/2001

(Continued)

*Primary Examiner* — Elvin G Enad
*Assistant Examiner* — Alexander Talpalatskiy
(74) *Attorney, Agent, or Firm* — Rabin & Berdo, P.C.

(57) ABSTRACT

A solenoid actuator (1) comprises a case (9) made of a magnetic material and housing a coil (12) wound on a bobbin (11), and a pressure tube (17) made of a non-magnetic material and fitted into a hollow portion of the bobbin (11). A base (2) and a sleeve (3) made of a magnetic material are disposed in the pressure tube (17). A plunger (4) provided in an operation chamber (74, 75) formed in the base (2) and the sleeve (3) strokes according to energization of the coil (12) to axially drive a shaft (5) fixed to the plunger (4). The pressure tube (17) ensures that magnetic flux is transferred between the case (9) and the sleeve (3) while preventing pressure variation in the operation chamber (74, 75) from being transmitted to the bobbin (11), thereby achieving a high response and a pressure tightness in the solenoid actuator (1).

9 Claims, 7 Drawing Sheets

U.S. PATENT DOCUMENTS

| | | | | |
|---|---|---|---|---|
| 6,919,786 | B2 * | 7/2005 | Krimmer et al. | 335/229 |
| 7,036,788 | B1 * | 5/2006 | Schneider et al. | 251/86 |
| 7,251,933 | B2 * | 8/2007 | Tsuchiya et al. | 60/403 |
| 7,414,502 | B2 * | 8/2008 | Tackes et al. | 335/220 |
| 7,503,543 | B2 * | 3/2009 | Nomichi et al. | 251/129.15 |
| 7,513,272 | B2 * | 4/2009 | Segi et al. | 137/625.65 |
| 2003/0034471 | A1 * | 2/2003 | Burrola et al. | 251/129.15 |
| 2003/0047699 | A1 * | 3/2003 | Sakata et al. | 251/129.15 |
| 2003/0136931 | A1 * | 7/2003 | Watanabe et al. | 251/129.15 |
| 2004/0050977 | A1 * | 3/2004 | Rieger et al. | 239/585.1 |
| 2004/0089833 | A1 * | 5/2004 | Muller et al. | 251/129.15 |
| 2005/0035320 | A1 * | 2/2005 | Tsuchiya et al. | 251/129.02 |
| 2005/0082504 | A1 * | 4/2005 | Sassone et al. | 251/129.15 |
| 2005/0083021 | A1 * | 4/2005 | Mahon | 320/166 |
| 2005/0269538 | A1 * | 12/2005 | Haynes et al. | 251/129.15 |
| 2006/0180783 | A1 * | 8/2006 | Tackes et al. | 251/129.15 |

FOREIGN PATENT DOCUMENTS

| | | | |
|---|---|---|---|
| DE | 3418654 | A1 | 11/1985 |
| DE | 69327329 | T2 | 4/2000 |
| DE | 102007012151 | A1 | 9/2008 |
| JP | 63265407 | A | 11/1988 |
| JP | 6-14412 | Y2 | 4/1994 |
| JP | 11-031617 | A | 2/1999 |

* cited by examiner

SOLENOID ACTUATOR

FIELD OF THE INVENTION

This invention relates to a solenoid actuator which drives a shaft axially using a magnetic force generated by a solenoid.

BACKGROUND OF THE INVENTION

A solenoid actuator for operating hydraulic equipment such as a needle valve by performing a linear motion, drives a plunger using a magnetic force generated by a coil, thereby driving a shaft fixed to the plunger in an axial direction.

JPH11-031617A, published by the Japan Patent Office in 1999, proposes a guide tube made of a non-magnetic material to support the plunger so as to be free to slide. The guide tube is formed in a cylindrical shape having a bottom and the plunger is housed in the guide tube so as to be free to slide therein. A base made of a magnetic material is disposed in the interior of an opening of the guide tube. The guide tube is fitted into a hollow portion of a bobbin on which a coil is wound. When the coil is energized, a magnetic flux is formed between the coil and the base via the plunger such that the plunger is attracted towards the base.

The guide tube functions as a pressure vessel which prevents a pressure change in a plunger working chamber from being transferred to the bobbin on the outside. The guide tube thereby ensures pressure tightness in the solenoid actuator.

SUMMARY OF THE INVENTION

According to this prior art, when the plunger slides on an inner circumferential surface of the guide tube, a sliding resistance between the plunger and the guide tube is inevitably generated. Further, since the plunger is surrounded by the guide tube made of a non-magnetic material, the cross-sectional area of a magnetic path formed between the coil and the plunger is reduced.

These phenomena may cause a delay in the driving response of the solenoid actuator.

It is therefore an object of this invention to increase a response of a solenoid actuator while preserving a pressure tightness thereof.

To achieve the above object, the invention provides a solenoid actuator attached to hydraulic equipment, comprising a shaft connected to the hydraulic equipment, a case made of a magnetic material, a bobbin made of a non-magnetic material and having a hollow portion, a coil wound on the bobbin and housed in the case, and a pressure tube made of a non-magnetic material and fitted into the hollow portion of the bobbin.

The shaft has an center axis. The pressure tube has open ends.

The solenoid actuator further comprises a base made of a magnetic material in a cylindrical shape and inserted into the pressure tube, and a sleeve made of a magnetic material in a cylindrical shape and disposed in the pressure tube to face the base via a magnetic gap in a direction of the center axis.

The case and the sleeve are magnetically connected through an open end of the pressure tube, and the base and the sleeve form an operation chamber on the inside thereof.

The solenoid actuator further comprises a plunger made of a magnetic material, fixed to the shaft, and housed in the operation chamber while maintaining an annular gap relative to a wall of the operation chamber so as to be free to displace along the center axis.

The details as well as other features and advantages of this invention are set forth in the remainder of the specification and are shown in the accompanying drawings.

DESCRIPTION OF THE PREFERRED EMBODIMENTS

Figure 2:
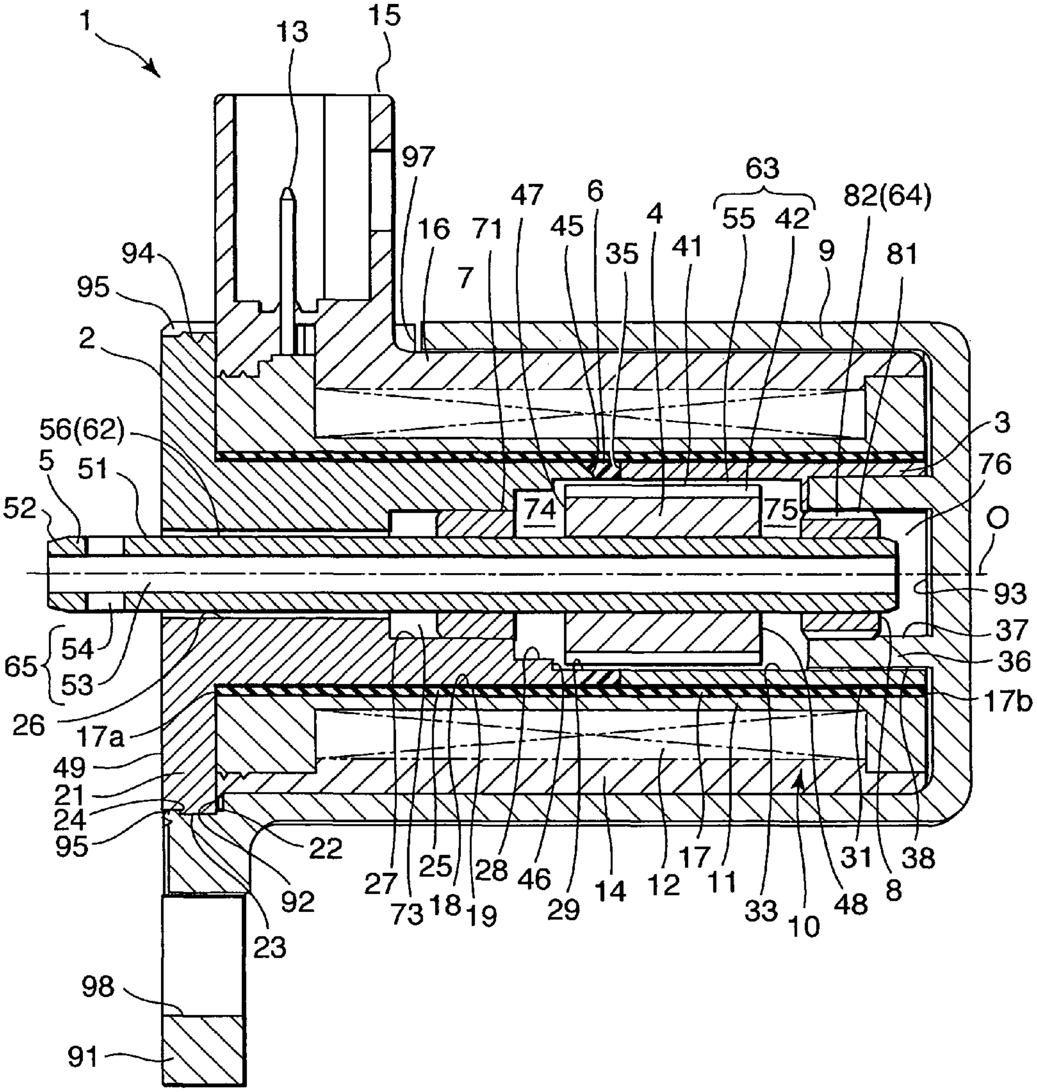
FIG. 2 is a sectional view of the solenoid actuator taken along a line II-O-II in FIG. 1.

Referring to FIG. 2 of the drawings, a solenoid actuator 1 according to this invention is configured to exert a magnetic force on a plunger 4 using a solenoid assembly 10 housed in a case 9, thereby driving a shaft 5 fixed to the plunger 4 in a direction of a center axis O.

Figure 1:
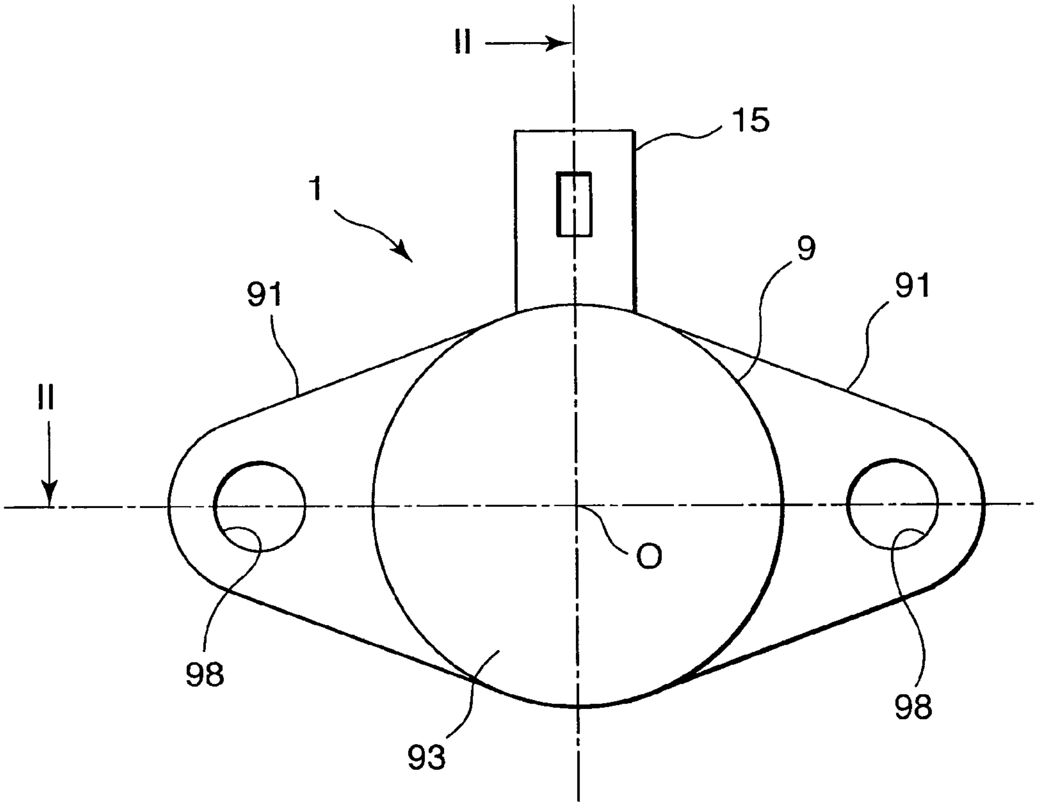
FIG. 1 is a rear view of a solenoid actuator according to this invention.

Referring to FIG. 1, the case 9 is formed in a cylindrical shape. An axial end of the case 9 is closed by a bottom 93 thereof. Another end of the case 9 is open, and fixed to hydraulic equipment such as a valve via a pair of flange parts 91 which extend laterally on both sides of the opening of the case 9. For this purpose, a bolt hole 98 is formed on each of the flange parts 91, and the solenoid actuator 1 is fixed to the hydraulic equipment by bolts penetrating the bolt holes 98.

Referring again to FIG. 2, the solenoid assembly 10 comprises a bobbin 11 formed in a cylindrical shape having a hollow portion with flanges at both ends, a coil 12 wound on the bobbin 11, a pair of terminals 13 electrically connected to either end of the coil 12, and a molding resin 14 that wraps the bobbin 11, the coil 12, and the terminals 13.

The molding resin 14 comprises a wrapping portion 16 which wraps the bobbin 11 and the coil 12, and a connector portion 15 projecting from a tip of the wrapping portion 16 in a radial direction and having an opening. The pair of terminals 13 project radially from the bobbin 11 into the connector portion 15. A connector of a power cable is inserted into the connector portion 15 so as to be connected to the terminals 13 on the inside of the connector portion 15. It is also possible to supply electric power to the coil 12 using a lead wire without providing the pair of terminals 13. The connector portion 15 projects radially from the case 9 via a cutout 97 formed in the case 9.

By supplying electric power to the coil 12, the coil 12 is energized and generates a magnetic flux around the coil 12.

The case 9, a base 2, the plunger 4, and a sleeve 3 function as magnetic path forming members to transfer the magnetic flux generated by the energized coil 12, All of these members are made of a magnetic material.

In FIGS. 1 and 2, the flange parts 91 are formed on an orthogonal plain to the center axis O. The connector portion 15 projects from the case 9 in an orthogonal direction to the center axis O.

The projecting direction of the flange part 91 and that of the connector portion 15 may be modified depending on the shape of the hydraulic equipment to which the solenoid actuator 1 is fixed. For example, the connector portion 15 may project along the center axis O such that the connector of the power cable is inserted into the connector portion 15 in parallel with the center axis O.

The base 2 and the sleeve 3 are respectively formed in a cylindrical shape. The base 2 and the sleeve 3 are disposed in the case 9 coaxially with the center axis O via a clearance. The base 2 is disposed on the hydraulic equipment side of the case 9 and the sleeve 3 is disposed on the bottom 93 side of the case 9.

A flange 21 is formed in the base 2 so as to contact the hydraulic equipment. The flange 21 is fitted into a recess 94 formed in a tip of the case 9 so as to form a contact surface that contacts the hydraulic equipment and is continuous with the flange parts 91.

A ring-shaped step portion 92 is formed in the recess 94. The flange 21 is fitted into the recess by seating a rim 22 of the flange 21 on the ring-shaped step portion 92.

A ring-shaped step portion 24 is formed on an outer circumferential surface 23 of the flange 21. On an outer side of the recess 94, a ring-shaped groove is formed in the case 9 nearby the flange 21 such that a tip of the case 9 between the recess 94 and the ring-shaped groove functions as a crimp portion 95. The crimp portion 95 is bent inwardly so as to grip the ring-shaped step portion 24, thereby preventing the base 2 from falling out of the case 9.

An inner cylindrical portion 36 which projects from the bottom surface 93 into the case 9 coaxially with the center axis O is formed in the case 9. The sleeve 3 is press-fitted onto an outer circumferential surface 38 of the inner cylindrical portion 36. A contact part between an inner circumferential surface 33 of the sleeve 3 and the outer circumferential surface 38 of the inner cylindrical portion 36 functions as a metal seal.

A tapered surface 45 inclined with respect to the center axis O is formed in a rear tip of the base 2 facing the sleeve 3. A front end face 35 of the sleeve 3 facing the tapered surface 45 is formed in a ring-shaped plane orthogonal to the center axis O. A space between the tapered surface 45 and the front end face 35 functions as a magnetic gap between the base 2 and the sleeve 3. The front end face 35 need not be formed in a ring-shaped plane orthogonal to the center axis O, and may be formed on an inclined surface, as in the case of the tapered face 45.

The magnetic gap is filled with a gap filler 6 made of a non-magnetic material. The gap filler 6 is in close contact with the tapered surface 45 of the base 2 and the front end face 35 of the sleeve 3.

A pressure tube 17 made of a non-magnetic metal material in a thin cylindrical shape is fitted onto an outer circumferential surface 25 of the base 2 and an outer circumferential surface 31 of the sleeve 3 via a plastic laminar sealing member 19. The plastic laminar sealing member 19 deforms according to a pressure and extends to fill a gap between an inner circumferential surface 18 of the pressure tube 17 and the outer circumferential surface 25 of the base 2 as well as a gap between the inner circumferential surface 18 of the pressure tube 17 and the outer circumferential surface 31 of the sleeve 3. By causing the pressure tube 17 to contact the base 2 and the sleeve 3 closely in this way, an operation space of the plunger 4 formed inside the base 2 and the sleeve 3 is tightly sealed even if the magnetic gap is not filled with the gap filler 6.

The length of the pressure tube 17 in the direction of the center axis O is equal to that of the bobbin 11. An open end 17*a* of the pressure tube 17 closely contacts the flange 21 of the base 2. Another open end 17*b* of the pressure tube 17 closely contacts the bottom 93 of the case 9. According to the above construction, the pressure tube 17 functions as a metal seal which prevents working oil in chambers formed in the base 2 and the sleeve 3 from leaking to the outside. The case 9, the base 2, the sleeve 3, and the pressure tube 17 form a pressure vessel fitted in the hollow portion of the bobbin 11 for housing the plunger 4 and a part of the shaft 5.

Instead of applying the plastic laminar sealing member 19 over the entire outer circumferential surfaces 25, 31 of the base 2 and the sleeve 3, the plastic laminar sealing member 19 may be applied only in an area covering an outer circumferential surface of the gap filler 6 and its vicinity.

The shaft 5 projects towards the hydraulic equipment from a front end face 49 of the base 2 located on the opposite side of the base 2 to the tapered surface 45.

The shaft 5 is made of a non-magnetic material. The shaft 5 is supported by a first bearing 7 in the base 2 and a second bearing 8 in the sleeve 3 so as to be free to slide along the center axis O. The plunger 4 is located between the first bearing 7 and the second bearing 8. The first bearing 7 and the second bearing 8 are made of a non-magnetic material.

The base 2 comprises inner circumferential surfaces 26-29 having diameters which increase in a step by step fashion towards the tapered surface 45.

The inner circumferential surface 26 having the smallest diameter covers the outer circumferential surface 51 of the shaft 5 via an annular gap 56. The inner circumferential surface 27 having the second smallest diameter supports an outer circumferential surface 71 of the first bearing 7. The inner circumferential surface 29 is formed to have an identical diameter to the inner circumferential surface 33 of the sleeve 3 and the inner circumferential surface of the gap filler 6. The plunger 4 is housed in an operation chamber formed by the inner circumferential surface 33 of the sleeve 3, the inner circumferential surface of the gap filler 6, and the inner circumferential surface 29 of the base 2.

The inner circumferential surface 28 having the third smallest diameter is formed between the inner circumferential surface 29 having the largest diameter and the inner circumferential surface 27 having the second smallest diameter in the base 2.

Figure 3:
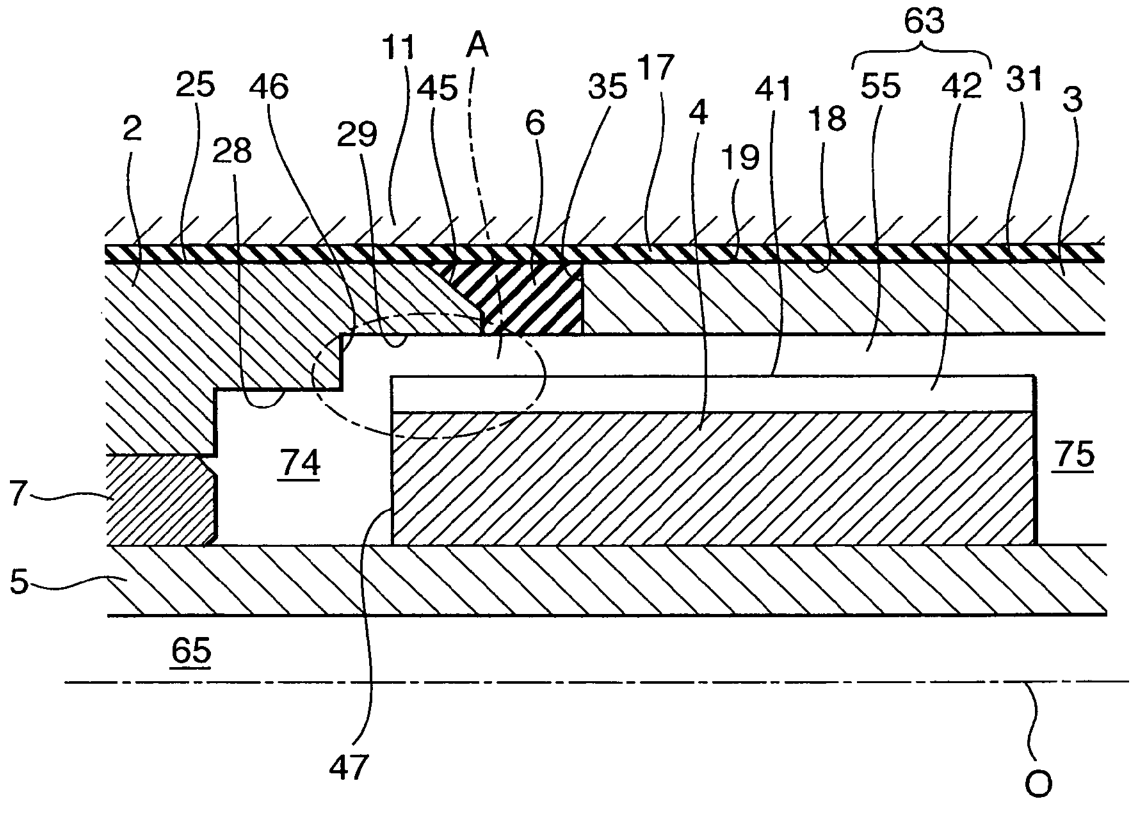
FIG. 3 is an enlarged longitudinal sectional view of a plunger and peripheral parts in the solenoid actuator.

Referring to FIG. 3, a magnetically attracting surface 46 which attracts the plunger 4 by a magnetic force of the energized coil 12 is formed in the base 2. The magnetically attracting surface 46 corresponds to a ring-shaped step portion formed between the inner circumferential surface 28 and the inner circumferential surface 29. The magnetically attracting surface 46 forms an orthogonal plane to the center axis O of the shaft 5. The diameter of the inner circumferential surface 28 is set to be smaller than a diameter of the plunger 4 such that the magnetically attracting surface 46 faces a front end face 47 of the plunger 4.

Referring again to FIG. 2, in the above-described pressure vessel formed by the base 2, the gap filler 6, the sleeve 3, and the case 9, a first bearing front chamber 73, a plunger front chamber 74, a plunger rear chamber 75, and a second bearing rear chamber 76 are formed facing the shaft 5 and/or the plunger 4. All of these chambers 73-76 are filled with working oil led from the hydraulic equipment. With respect to the name of these chambers, “front” denotes a hydraulic equipment side and “rear” denotes an opposite side.

The plunger front chamber 74 and the plunger rear chamber 75 are a part of the operation chamber.

The first bearing front chamber 73 is formed in the inner circumferential surface 27 in front of the first bearing 7. The first bearing front chamber 73 is connected to the gap 56. The gap 56 forms a base oil passage 62 which connects the hydraulic equipment and the first bearing front chamber 73. It is possible to design the base oil passage 62 to store a contaminant by increasing the diameter of the inner circumferential surface 26 of the base 2 delimiting the gap 56 such that the base oil passage 62 has a larger cross-sectional area.

The plunger front chamber 74 is formed between the first bearing 7 and the front end face 47 of the plunger 4. The plunger front chamber 74 corresponds to the interior of the inner circumferential surface 28 and a frontmost part of the inner circumferential surface 29. The first bearing 7 does not have an oil passage, and therefore working oil communication between the first bearing front chamber 73 and the plunger front chamber 74 is interrupted by the first bearing 7.

The plunger rear chamber 75 is formed between a rear end face 48 of the plunger 4 and the second bearing 8 in the interior of the inner circumferential surface 33 of the sleeve 3.

The plunger front chamber 74 and the plunger rear chamber 75 are separated by the plunger 4. An annular gap 55 is provided between a wall of the operation chamber and an outer circumferential surface 41 of the plunger 4 so that the plunger 4 is not caused to contact the sleeve 3 by the magnetic force. Herein, the wall of the operation chamber corresponds to the inner circumferential surface 33 of the sleeve 3, the inner circumferential surface of the gap filler 6, and the inner circumferential surface 29 of the base 2. The gap 55 forms a plunger exterior oil passage 63 which connects the plunger front chamber 74 and the plunger rear chamber 75.

A plurality of grooves 42 are formed in the outer circumferential surface 41 of the plunger 4 in parallel with the center axis O as a part of the plunger exterior oil passage 63. Working oil flows between the plunger front chamber 74 and the plunger rear chamber 75 via the plunger exterior oil passage 63 thus constructed.

By forming the plurality of grooves 42 in the outer circumferential surface 41 of the plunger 4, a width of the gap 55 can be narrowed without decreasing the flow cross-sectional area of the working oil. Narrowing the gap 55 improves a driving efficiency of the plunger 4.

The second bearing rear chamber 76 is formed between the second bearing 8 and the bottom 93 in the interior of the inner cylindrical portion 36.

The second bearing 8 has an outer circumferential surface 81 supported by an inner circumferential surface 37 of the inner cylindrical portion 36. A plurality of grooves 82 are formed in the outer circumferential surface 81 of the second bearing 8 in parallel with the center axis O. The grooves 82 form a second bearing oil passage 64 connecting the plunger rear chamber 75 to the second bearing rear chamber 76.

A longitudinal through-hole 53 penetrates the shaft 5 in the direction of the center axis O. A lateral through-hole 54 which is orthogonal to the center axis O penetrates a projecting portion 52 of the shaft 5 projecting from the base 2. The longitudinal through-hole 53 and the lateral through-hole 54 form a shaft-penetrating oil passage 65 connecting the hydraulic equipment to the second bearing rear chamber 76.

An opening of the longitudinal through-hole 53 formed in the projecting portion 52 is closed by the hydraulic equipment when the solenoid actuator 1 is attached to the hydraulic equipment. The lateral through-hole 54 is however exposed to the interior of the hydraulic equipment when the solenoid actuator 1 is attached to the hydraulic equipment.

When the solenoid actuator 1 is attached to the hydraulic equipment, the solenoid actuator 1 is filled with working oil in the following manner.

- working oil from the hydraulic equipment fills the first bearing front chamber 73 via the base oil passage 62;
- working oil from the hydraulic equipment fills the second bearing rear chamber 76 via the shaft-penetrating oil passage 65;
- working oil in the second bearing rear chamber 76 fills the plunger rear chamber 75 via the second bearing oil passage 64; and
- working oil in the plunger rear chamber 75 fills the plunger front chamber 74 via the plunger exterior oil passage 63.

The solenoid actuator 1 drives the plunger 4 using the magnetic force generated by the coil 12 such that the shaft 5 fixed to the plunger 4 is driven axially.

When the coil 12 is not energized, the shaft 5 is kept in a retreated position by a reaction force of the hydraulic equipment. The retreated position herein corresponds to an initial position of the shaft 5.

When the coil 12 is energized, the plunger 5 is attracted towards the magnetically attracting surface 46 by an effect of the magnetic field formed in the interior of the coil 12. The thrust generated by the magnetic field causes the plunger 4 to move towards the magnetically attracting surface 46, thereby driving the shaft 5 forward to operate the hydraulic equipment. An operation of the hydraulic equipment denotes, for example, opening/closing of a valve. FIG. 2 shows a state in which the shaft 5 has stroked forward slightly from the initial position.

When the plunger 4 strokes forward together with the shaft 5, working oil corresponding to the volume of the shaft 5 which withdraws from the second bearing rear chamber 76 flows into the second bearing rear chamber 76 from the hydraulic equipment via the shaft-penetrating oil passage 65.

Further, working oil corresponding to the stroke volume of the plunger 4 moves from the contracting plunger front chamber 74 to the expanding plunger rear chamber 75 via the plunger exterior oil passage 63.

When energization of the coil 12 is stopped, the shaft 5 strokes rearward due to the reaction force of the hydraulic equipment, which is the opposite way to the direction in which the shaft 5 is driven by the energized coil 12.

As the shaft 5 strokes rearward, working oil corresponding to the invasion volume of the shaft 5 into the second bearing rear chamber 76 is expelled from the second bearing rear chamber 76 to the hydraulic equipment via the shaft-penetrating oil passage 65.

Further, as the plunger 4 strokes rearward, working oil corresponding to the stroke volume of the plunger 4 moves from the contracting plunger rear chamber 75 to the expanding plunger front chamber 74 via the plunger exterior oil passage 63.

According to the construction described above, the pressure tube 17, the base 2, the sleeve 3, and the case 9 form a tightly closed pressure vessel such that the working oil flowing into the pressure vessel from the hydraulic equipment is prevented from leaking to the outside. The pressure vessel ensures pressure tightness in the solenoid actuator 1 by preventing pressure from being transferred to the bobbin 11 therefrom.

According to this solenoid actuator 1, the pressure tube 17 made of a non-magnetic metal material is interposed between the bobbin 11 and the base 2 and between the bobbin 11 and the sleeve 3. However, since the sleeve 3 is in contact with the inner cylindrical portion 36 of the case 9 through an open end **17*b* of the pressure tube 17 and the flange 21 of the base 2 extends to cover an end face of the bobbin 11, the pressure tube 17 made of a non-magnetic metal material does not interrupt a magnetic flux circulating though the case 9, the sleeve 3, the plunger 4, and the base 2**.

Further, the plunger 4 is housed in the operation chamber formed by the inner circumferential surface 29 of the base 2, an inner circumferential surface of the gap filler 6, and the inner circumferential surface 33 of the sleeve 3, and an annular gap 55 is provided between the wall of the operation chamber and the outer circumferential surface 41 of the plunger 4. Accordingly, the plunger 4 strokes without receiving frictional resistance from the wall of the operation chamber.

According to this solenoid actuator 1, therefore, an operation response of the hydraulic equipment is improved while preserving a pressure tightness in the pressure vessel.

Figure 4:
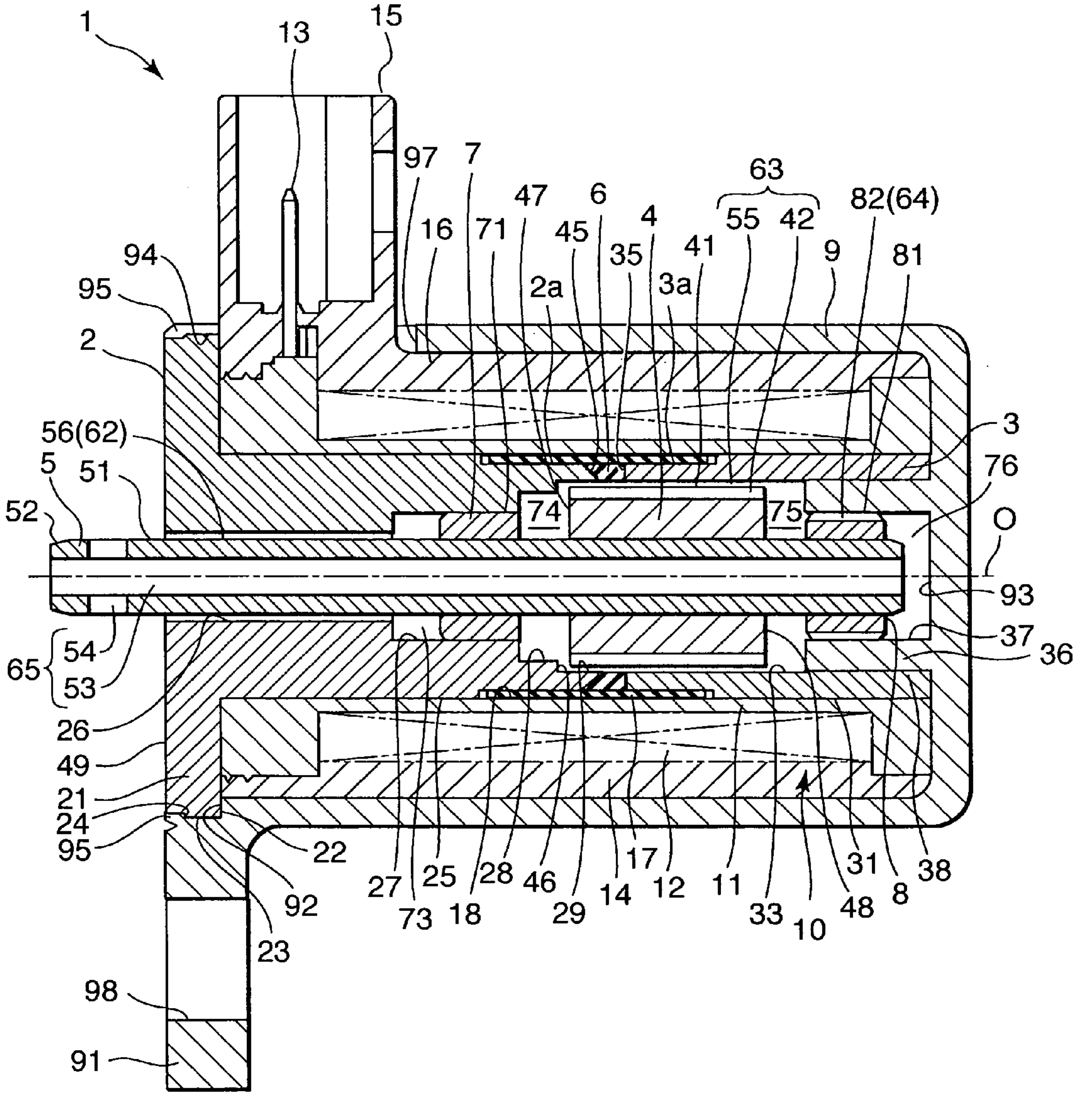
FIG. 4 is similar to FIG. 2, but shows a second embodiment of this invention.

Referring to FIG. 4, a second embodiment of this invention will be described.

Components of this embodiment that have the same construction as those of the first embodiment shown in FIGS. 1-3 are given identical component numbers, and their description is herein omitted.

In a solenoid actuator 1 according to this embodiment, the length of the pressure tube 17 in the direction of the center axis O is set to be shorter than that of the first embodiment. Herein, the pressure tube 17 is set to have a length that covers only the gap filler 6 between the base 2 and the sleeve 3 and its vicinity.

A recess 2*a* of an annular shape is formed on the outer circumferential surface 25 of a rear tip of the base 2 and a recess 3*a* of an annular shape is formed on the outer circumferential surface 31 of a front tip of the sleeve 3. The pressure tube 17 is press-fitted into these recesses 2*a*, 3*a*.

As a result of the press-fitting, the inner circumferential surface 18 of the pressure tube 17 closely contacts the recess 2*a* and the recess 3*a*, thereby functioning as a metal seal to tightly close the pressure vessel. According to this embodiment, therefore, the plastic laminar sealing member 19 is not required.

In this embodiment, the case 9, the base 2, the pressure tube 17, and the sleeve 3 form the pressure vessel. The pressure vessel prevents working oil flowing into the solenoid actuator 1 from the hydraulic equipment from leaking to the outside of the pressure vessel. It also causes the plunger 4 to stroke together with the shaft 5 with a high response according to an on/off operation of an energizing current supplied to the coil 12.

According to this embodiment, therefore, pressure tightness and a high operation response can be achieved in a solenoid actuator through a simple construction.

Figure 5:
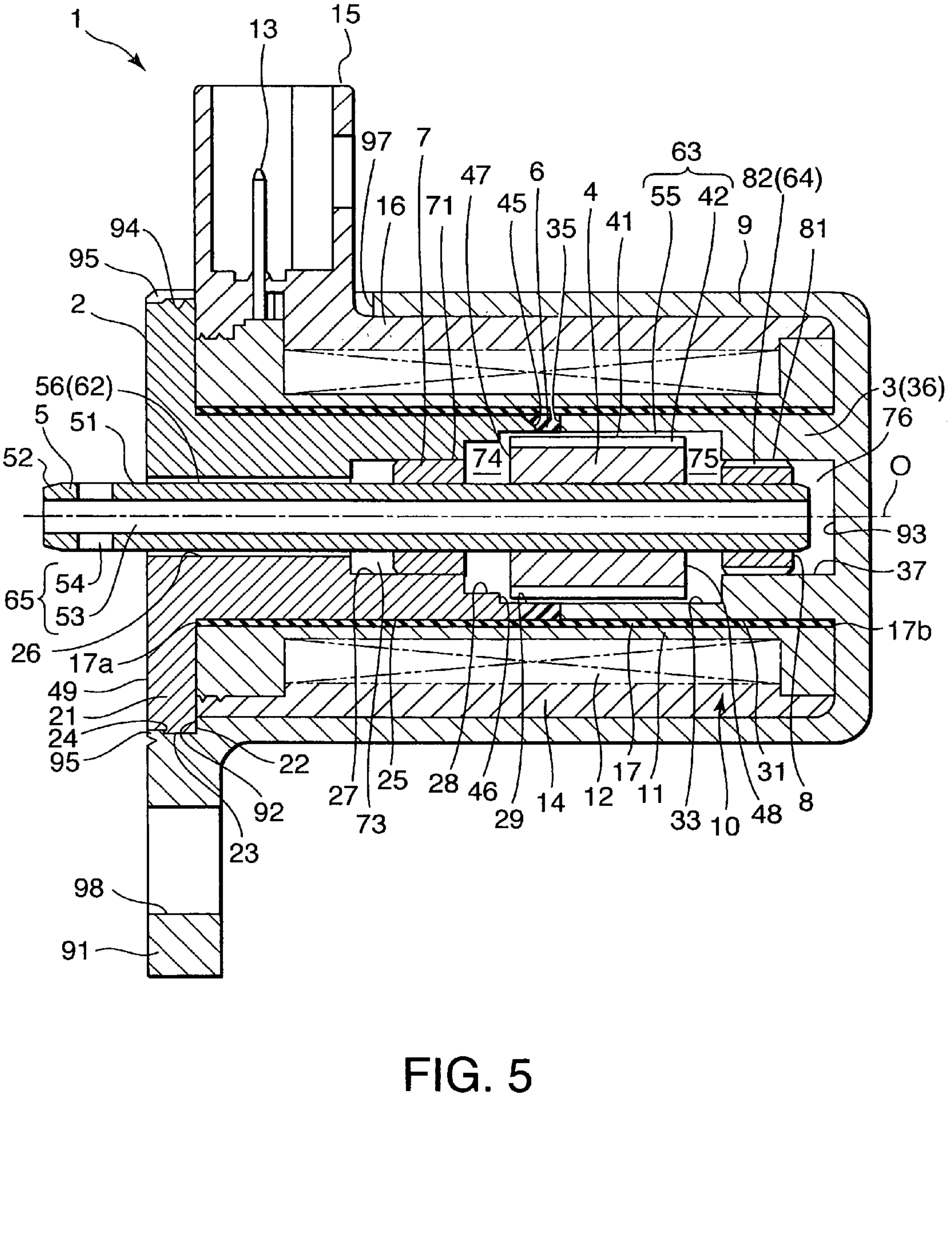
FIG. 5 is similar to FIG. 2, but shows a third embodiment of this invention.

Referring to FIG. 5, a third embodiment of this invention will be described.

Components of this embodiment that have the same construction as those of the first embodiment shown in FIGS. 1-3 are given identical component numbers, and their description is herein omitted.

In a solenoid actuator 1 according to this embodiment, a pressure tube 17 made of a non-magnetic metal material is fitted in advance, by means of insert molding, into the hollow portion of the bobbin 11 which is made of a resin.

According to this embodiment, a sleeve 3 is integrally constructed with the inner cylindrical portion 36 of the case 9. The outer circumferential surface 81 of the second bearing 8 is fitted into the inner circumferential surface 37 of the inner cylindrical portion 36.

The bobbin 11 is press-fitted onto the outer circumferential surface 31 of the sleeve 3 via the pressure tube 17. After fitting the second bearing 8, the plunger 4, and the first bearing 7 in the pressure tube 17 together with the shaft 5, the gap filler 6 is inserted into the pressure tube 17, and the base 2 is press-fitted onto the inner circumferential surface 18 of the pressure tube 17. Finally, the crimp portion 95 is bent radially inward.

By applying press-fitting, the pressure tube 17 closely contacts the outer circumferential surface 25 of the base 2 and the outer circumferential surface 31 of the sleeve 3, thereby functioning as a metal seal. According to this embodiment also, the plastic laminar sealing member 19 is not used.

According to this embodiment, since the pressure tube 17 is fitted to the solenoid assembly 10 in advance, the solenoid actuator 1 can be assembled more easily. Further, since the sleeve 3 is integrally constructed with the inner cylindrical portion 36, highly precise concentricity can be achieved in the components of the pressure vessel.

Figure 6:
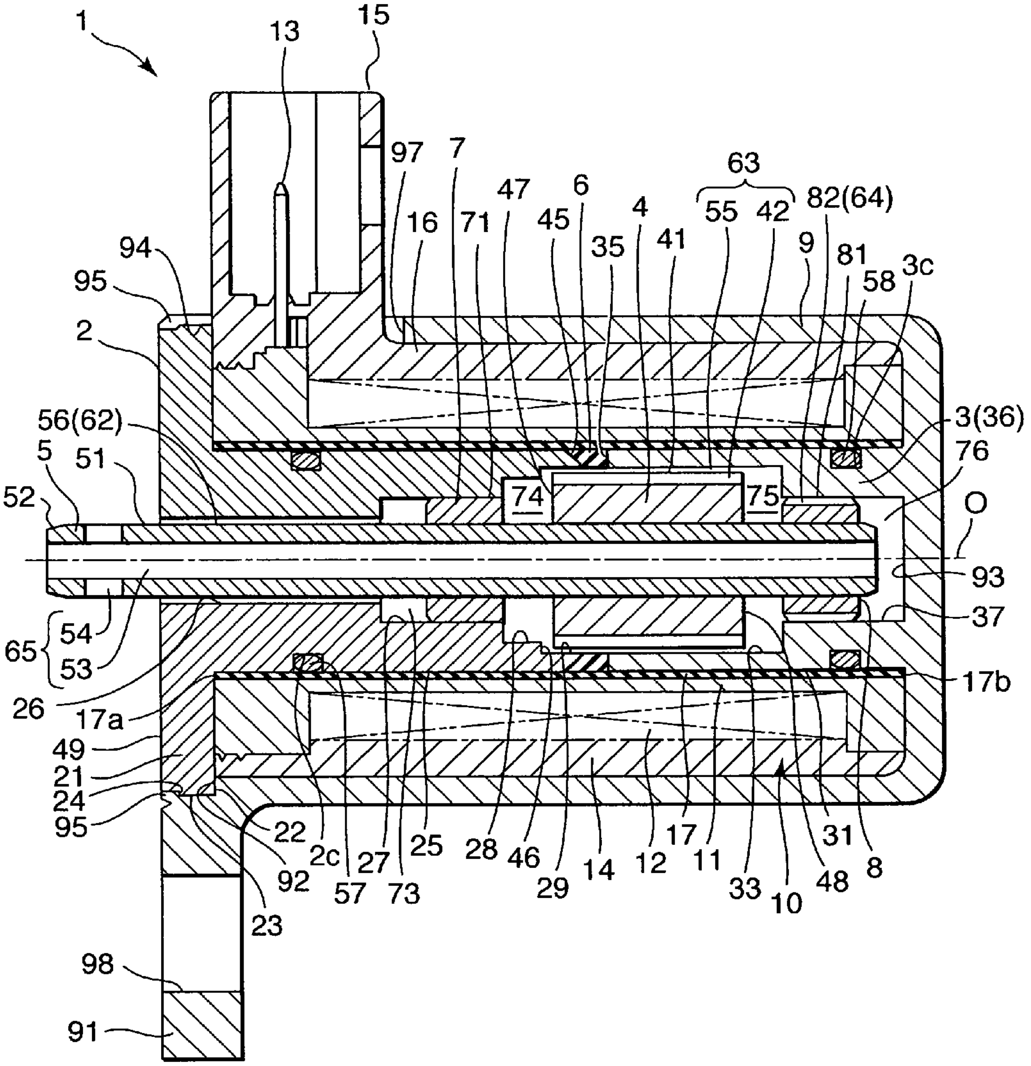
FIG. 6 is similar to FIG. 5, but shows a fourth embodiment of this invention.

Referring to FIG. 6, a fourth embodiment of this invention will be described.

This embodiment resembles the third embodiment. Components of this embodiment that have the same construction as those of the third embodiment are given identical component numbers, and their description is herein omitted.

In a solenoid actuator 1 according to this embodiment also, a pressure tube 17 made of a non-magnetic metal material is fitted in advance by insert molding into the hollow portion of the bobbin 11 made of a resin. However, this embodiment differs from the third embodiment in a fitting structure of the bobbin 11 onto the base 2 and the sleeve 3.

Specifically, the bobbin 11 is not press-fitted to the base 2 and the sleeve 3, but fitted onto the outer circumferential surface 25 of the base 2 via an O-ring 57 and onto the outer circumferential surface 31 of the sleeve 3 via an O-ring 58. The O-ring 57 is housed in a ring groove 2*c* formed in the outer circumferential surface 25 of the base 2 and the O-ring 58 is housed in a ring groove 3*c* formed in the outer circumferential surface 31 of the sleeve 3. These O-rings 57, 58 prevent working oil in the pressure vessel from leaking to the outside.

According to this embodiment, since the bobbin 11 is not press-fitted to the base 2 and the sleeve 3, no flashes accompanying press-fitting remain in the pressure vessel and no distortion due to press-fitting arises in the bobbin 11.

Figure 7:
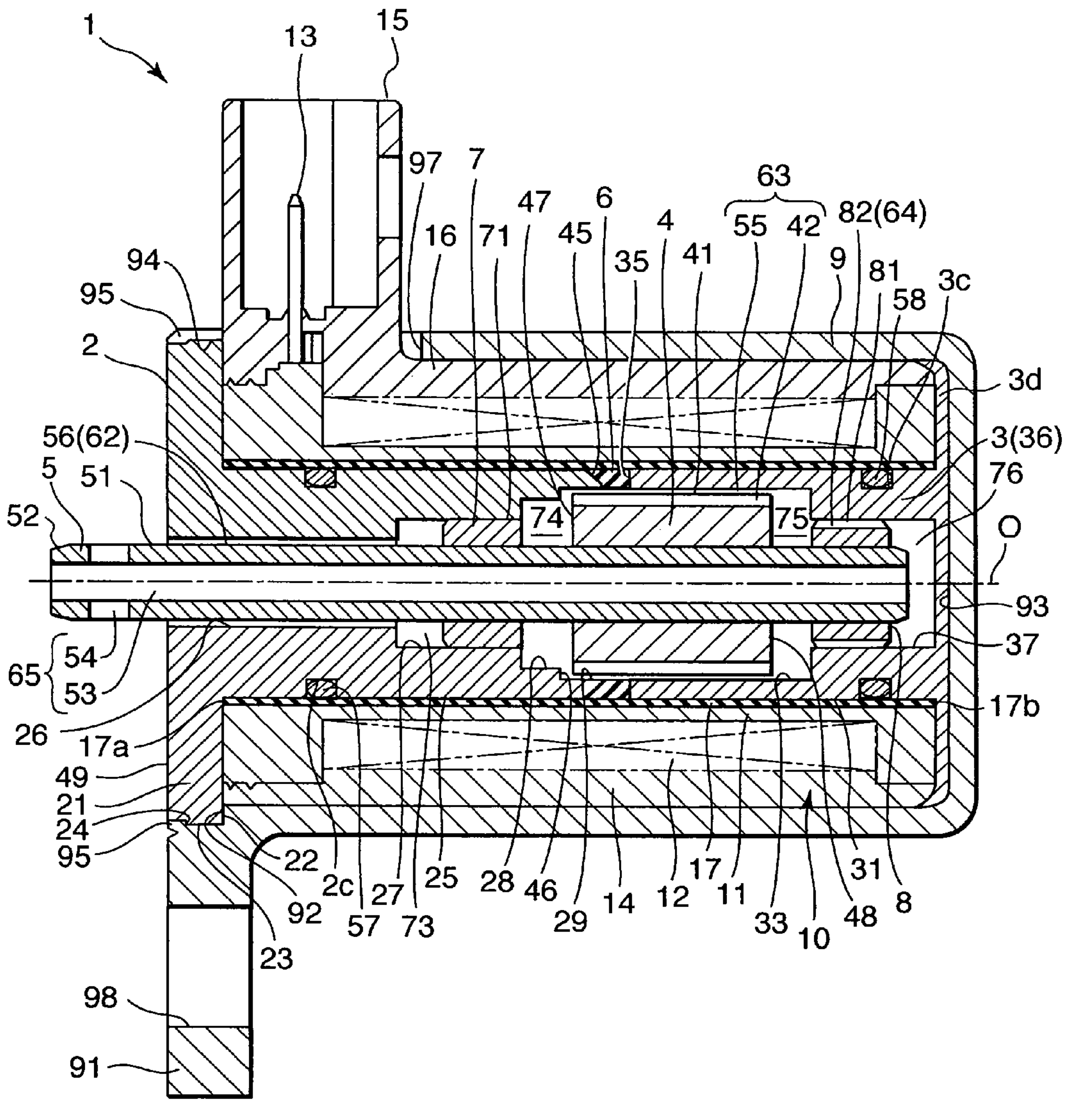
FIG. 7 is similar to FIG. 6, but shows a fifth embodiment of this invention.

Referring to FIG. 7, a fifth embodiment of this invention will be described.

This embodiment resembles the fourth embodiment. Components of this embodiment that have the same construction as those of the fourth embodiment are given identical component numbers, and their description is herein omitted.

In a solenoid actuator 1 according to this embodiment, the sleeve 3 is constructed separately from the case 9. The sleeve 3 is formed in a cylindrical shape having a bottom portion 3*d*. The bottom portion 3*d* extends radially outward in a flange-like fashion. The diameter of the bottom portion 3*d* is equal to the inner diameter of the case 9 such that the sleeve 3 is located concentrically with the center axis O. The other components are identical to those of the fourth embodiment.

In the solenoid actuator 1 according to this embodiment, the base 2, the pressure tube 17, and the sleeve 3 form the pressure vessel.

In other words, the case 9 is not a component of the pressure vessel. As a result, machining precision required for the case 9 can be lowered and machining of the case 9 is rendered easy according to this embodiment.

The contents of Tokugan 2008-292296, with a filing date of Nov. 14, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

The embodiments of this invention in which an exclusive property or privilege is claimed are defined as follows:

1. A solenoid actuator attached to hydraulic equipment, comprising:

a shaft connected to the hydraulic equipment, the shaft having a center axis;

a case made of a magnetic material;

a bobbin made of a non-magnetic material and having a hollow portion;

a coil wound on the bobbin and housed in the case;

a pressure tube made of a non-magnetic material and fitted into the hollow portion of the bobbin, the pressure tube having a first open end and a second open end;

a base made of a magnetic material in a cylindrical shape and inserted into the pressure tube;

a sleeve made of a magnetic material in a cylindrical shape and disposed in the pressure tube to face the base via a magnetic gap in the direction of the center axis, the case and the sleeve being magnetically connected through the first open end of the pressure tube, and the base and the sleeve forming an operation chamber on the inside thereof; and a plunger made of a magnetic material, fixed to the shaft and housed in the operation chamber while maintaining an annular gap relative to a wall of the operation chamber so as to be free to displace along the center axis, wherein the case comprises an inner cylindrical portion which projects into the pressure tube, and the sleeve is fitted onto an outer circumferential surface of the inner cylindrical portion.

2. The solenoid actuator as defined in claim 1, wherein the bobbin is made of a resin and the pressure tube is made of a non-magnetic metal.

3. The solenoid actuator as defined in claim 2, wherein the base comprises a flange which faces the hydraulic equipment, the second open end of the pressure tube is in contact with the flange and the first open end of the pressure tube is in contact with the case.

4. The solenoid actuator as defined in claim 1, further comprising a plastic laminar sealing member which is sandwiched between the pressure tube and the base and between the pressure tube and the sleeve.

5. The solenoid actuator as defined in claim 1, wherein the pressure tube is press-fitted to an outer circumferential surface of the sleeve and the base is press-fitted to an inner circumferential surface of the pressure tube.

6. The solenoid actuator as defined in claim 2, wherein the pressure tube is fitted in the hollow portion of the bobbin by insert molding.

7. The solenoid actuator as defined in claim 1, further comprising an O-ring interposed between the pressure tube and the base and an O-ring interposed between the pressure tube and the sleeve.

8. The solenoid actuator as defined in claim 1, wherein the sleeve is integrally constructed with the case.

9. The solenoid actuator as defined in claim 1, wherein the magnetic gap is filled with a gap filler made of a non-magnetic material.

* * * * *